United States Patent
Jagota et al.

(10) Patent No.: US 10,552,744 B2
(45) Date of Patent: Feb. 4, 2020

(54) RULE SET INDUCTION

(71) Applicant: salesforce.com, inc., San Francisco, CA (US)

(72) Inventors: Arun Kumar Jagota, Sunnyvale, CA (US); Cem Gurkok, Coral Gables, FL (US)

(73) Assignee: salesforce.com, inc., San Francisco, CA (US)

( * ) Notice: Subject to any disclaimer, the term of this patent is extended or adjusted under 35 U.S.C. 154(b) by 519 days.

(21) Appl. No.: 15/368,173

(22) Filed: Dec. 2, 2016

(65) Prior Publication Data

US 2018/0157988 A1 Jun. 7, 2018

(51) Int. Cl.
 *G06N 5/00* (2006.01)
 *G06N 5/02* (2006.01)

(52) U.S. Cl.
 CPC ................... *G06N 5/025* (2013.01)

(58) Field of Classification Search
 CPC ..................................................... G06N 5/025
 USPC .......................................................... 706/12
 See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

U.S. Appl. No. 13/986,251, filed Apr. 16, 2013.

*Primary Examiner* — Hien D Khuu
(74) *Attorney, Agent, or Firm* — Dergosits & Noah LLP; Todd A. Noah

(57) ABSTRACT

System receives inputs, each input associated with a label and having features, creates a rule for each feature, each rule including a feature and a label, each rule stored in a hierarchy, and distributes each rule into a partition associated with a label or another partition associated with another label. System identifies a number of inputs that include a feature for a rule in the rule partition, and identifies another number of inputs that include both the feature for the rule and another feature for another rule in the rule partition. System deletes the rule from the hierarchy if the ratio of the other number of inputs to the number of inputs satisfies a threshold and an additional number of inputs that includes the other antecedent feature is at least as much as the number. System predicts a label for an input including features by applying each remaining rule to the input.

17 Claims, 3 Drawing Sheets

(56) References Cited

U.S. PATENT DOCUMENTS

| | | | |
|---|---|---|---|
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,519,580 B1 * | 2/2003 | Johnson | G06K 9/6282 706/47 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,818,797 B1 * | 10/2010 | Fan | H04L 63/1425 726/22 |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2002/0184181 A1 * | 12/2002 | Agarwal | G06F 16/353 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0094201 A1 * | 4/2007 | Dejean | G06F 16/84 706/47 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0292660 A1 * | 11/2009 | Behal | G06N 20/00 706/12 |
| 2012/0233137 A1 | 9/2012 | Jakobson | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |

* cited by examiner

200

| Feature | Support | Highest Confidence Label | Confidence | Parent Feature |
|---|---|---|---|---|
| a1 | 1 | High Value | 1 | an |
| a2 | 1 | High Value | 1 | an |
| b1 | 1 | High Value | 1 | bn |
| b2 | 1 | High Value | 1 | bn |
| an | 2 | High Value | 1 | |
| bn | 2 | High Value | 1 | |
| c | 5 | High Value | 0.8 | |
| d | 1 | Low Value | 1 | |
| e | 1 | Low Value | 1 | |
| f | 1 | Low Value | 1 | |
| g | 2 | Low Value | 1 | |

202

| Partition | r | s | $n_{rs}$ | $P(s|r)$ |
|---|---|---|---|---|
| P1 | an | c | 2 | 1 |
| P1 | bn | c | 2 | 1 |
| P1 | an | bn | 0 | 0 |
| P2 | d | e | 1 | 1 |
| P2 | d | f | 0 | 0 |
| P2 | d | g | 0 | 0 |
| P2 | e | f | 0 | 0 |
| P2 | e | g | 0 | 0 |
| P2 | f | g | 1 | 1 |

RULE SET INDUCTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Rule induction is an area of machine learning in which formal rules or principals are extracted from a set of observations. The extracted rules may represent a full scientific model of the observed data, or merely represent local patterns in the data. Some major rule induction paradigms include association rule algorithms and decision rule algorithms.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
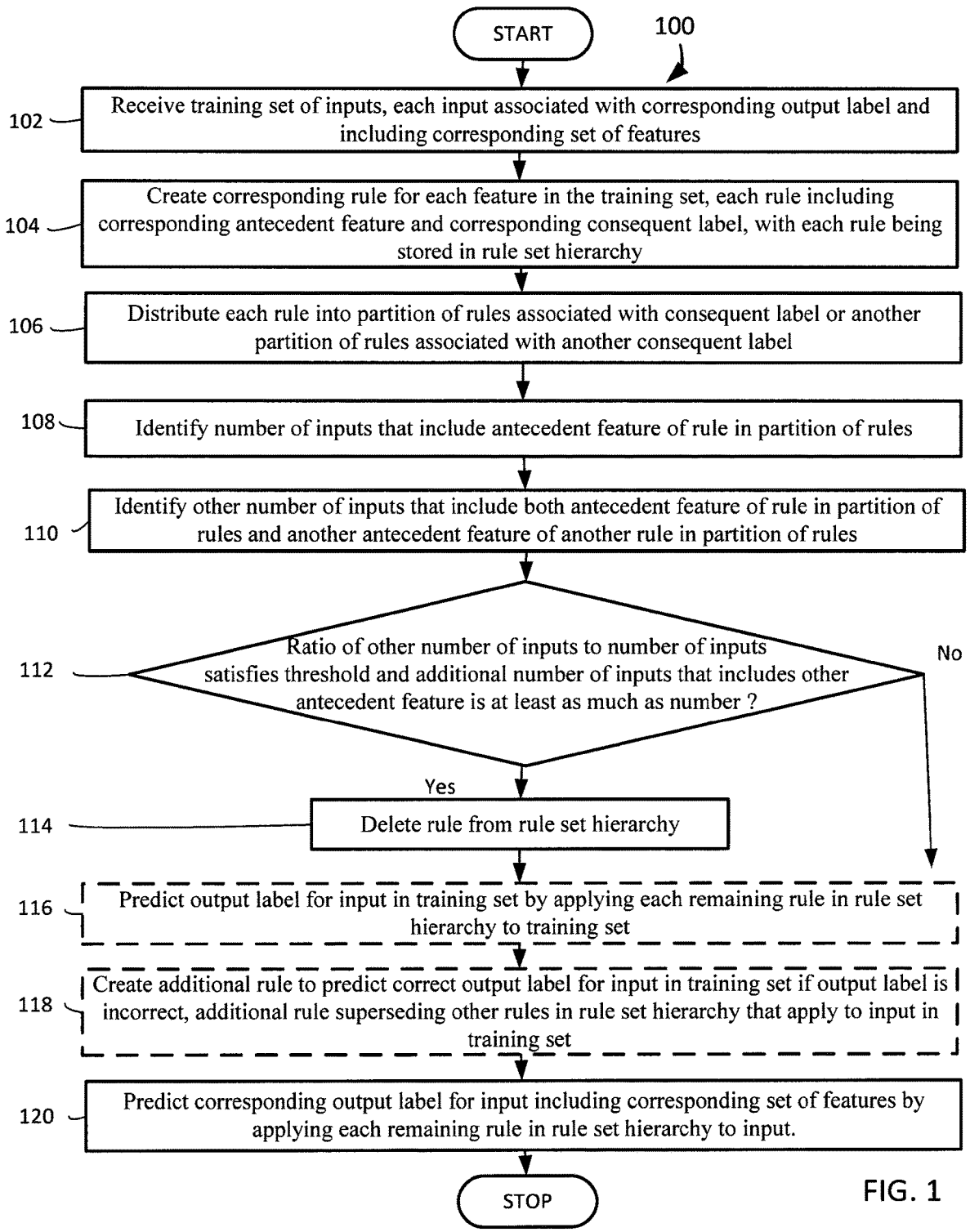
FIG. 1 is an operational flow diagram illustrating a high level overview of a method for rule set induction, in an embodiment.

Methods and mechanisms for rule set induction will be described with reference to example embodiments. The following detailed description will first describe a method for rule set induction. Next, example data structures for rule set induction are described.

In accordance with embodiments described herein, there are provided systems and methods for rule set induction. A system receives a training set of multiple inputs, each input associated with a corresponding output label and including a corresponding set of features. The system creates a corresponding rule for each feature in the training set, each rule including a corresponding antecedent feature and a corresponding consequent label, with each rule being stored in a rule set hierarchy. The system distributes each rule into a rule partition associated with a consequent label or another rule partition associated with another consequent label. The system identifies a number of inputs that include an antecedent feature of a rule in the rule partition. The system identifies another number of inputs that include both the antecedent feature of the rule and another antecedent feature of another rule in the rule partition. The system deletes the rule from the rule set hierarchy if the ratio of the other number of inputs to the number of inputs satisfies a threshold and an additional number of inputs that includes the other antecedent feature is at least as much as the number. The system predicts a corresponding output label for an input including a corresponding set of features by applying each remaining rule in the rule set hierarchy to the input.

For example, the system receives a training set of server name inputs with corresponding value labels, including a1.c.com with high value, a2.c.com with high value, b1.c.com with high value, b2.c.com with high value, d.e.com with low value, f.g.com with low value, and c.g.com with low value. The system creates a corresponding rule for each server name's feature predicting a corresponding value, including a1 predicts high value, a2 predicts high value, b1 predicts high value, b2 predicts high value, c predicts both high value and low value, d predicts low value, e predicts low value, f predicts low value, and g predicts low value. The system distributes each rule into a high value rule partition or a low value rule partition. The system identifies 1 input that includes the a1 feature for the rule a1 predicts high value in the high value rule partition. The system identifies 1 input that include both the a1 feature for the rule a1 predicts high value and the c feature for the rule c predicts high value in the high value rule partition. The system deletes the redundant rule a1 predicts high value from the rule set hierarchy because the 1.0 ratio of 1 a1 and c input to 1 a1 input satisfies a threshold value of 0.8 and the 5 inputs that includes the feature c is at least as much as the 1 input that includes the feature a1. The system efficiently predicts high value for an input that includes the features a1 and c by applying each remaining rule in the optimized rule set hierarchy to the input, without applying the deleted redundant rule a1 predicts high value.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A training set includes (input, label) pairs, where input is a vector of features, and label is a categorical value, from a set of at least two values. The system automatically learns a set of high confidence rules from such a training set. Each rule takes the general form "if input contains (or matches) feature f, then predict label to be c." The rules collectively cover the training set. That is, for every input in the training set, at least one rule in the rule set applies. High confidence can mean that whenever a rule predicts, its prediction is almost always correct. That is, for a given $\theta$, $P(clf) \geq \theta$. The support of a rule is the number of instances in the training set to which the rule applies. In such a rule, f is a regular expression. Since the system favors rules with high support, and favors rules that have low overlap with other rules, the system favors small rule sets that cover the training set. The system derives certain features from the input, and uses these features for training and prediction. Unlike standard rule induction algorithms, the system arranges the features and their rules in a hierarchy.

The value from inducing a rule set can extend beyond prediction purposes. Transparent rules, along with their support and confidence, facilitate white box inspection. Induced rule sets can attach an explanation to a prediction, specifically which rules were involved in that prediction. Humans can edit an induced rule set to improve the rules, which can be useful when the training set does not capture certain domain knowledge that only humans know.

Since the system's input is text, base features are tokens in the text. The token separator(s) depends on the use case. For example, in a use case involving server names, the token separator can be a ".". In other use cases, white space may work better. The system can apply a sequence of coarsening or generalizing operations to a base feature f, resulting in the features $f_1, f_2, \ldots f_k$. Thus, $f_1, f_2, \ldots f_k$ can form a path in a hierarchy, with f at the lowest (most specific) level. Coarsening or generalizing features can enable the discovery of general rules, which are high support rules relative to low support specific rules. The coarsening or generalizing of features can include blurring digits, such as blurring the rightmost digits of an input into corresponding placeholder digits, which may be referred to as suffix placeholders. The coarsening or generalizing of features can also include blurring numbers, such as collapsing the rightmost digits of an input into a single placeholder, which may be referred to as a single suffix placeholder. In some examples:
docker02→digits-blurr→dockerdd→num-blurr→dockern
db01→digits-blurr→dbdd→num-blurr→dbn Therefore, if db01, db02, . . . db15 are all strongly predictive of a label value, then the single rule "If input contains dbn, then label value" has higher support than the individual rules, while maintaining high confidence.

The system executes a rule set induction algorithm in phases, such as an initial rule set induction phase and a conjunctive rules addition phase. The initial rule set induction phase can have various sub-phases, such as a hierarchy construction sub-phase, a unary rule sub-phase, and a rule set pruning sub-phase. The conjunctive rules addition phase can have various sub-phases, such as a rule proposal sub-phase and a new rule construction sub-phase. In the hierarchy construction sub-phase, the system can construct a hierarchy in one pass over the training set, compute the support at each node in the hierarchy, and compute the highest confidence label value and its confidence. The hierarchy can be represented as a map M of node →parent pairs, with the leaves collected into a set L. To this hierarchy, the system can add a new node whose children are the roots in the hierarchy before the new node was added, with the new node becoming a new root. The system can derive a unary rule for the new node in a special way, in which the consequent is the majority label in the training set, with no confidence limit set.

Once M and L are ready, the system can construct an initial rule set of high support, high confidence unary features during the unary rule sub-phase, as follows:

```
R ← { }
for l in L
    A ← find highest ancestor of L whose confidence is ≥θ
    If A exists insert A into R
Endfor
```

During the rule set pruning sub-phase, the system can partition rule set R into disjoint rule sets $R_1, \ldots R_C$, where 1, . . . c denote label values. Next, in one pass over the training set, the system can do the following for each partition:

For every pair of rules (r, s) in $R_i$ in which r's support is no greater than that of s, the system can calculate $n_{rs}$, the number of instances in the training set in which both r and s fire.

When this pass is over, the system can compute P(s|r)= $n_{rs}/n_r$ for every qualifying pair (r, s) in $R_i$. Next, the system can delete rules covered by other rules, as follows. First, the system can construct a directed graph whose nodes are rules in $R_i$. The system can make this graph k-partite, where k is the distinct number of support values in $R_i$. Each part contains all nodes having the same support. The system can order these parts by increasing support. The system can now add arcs to this graph as follows.

First, the system can consider every pair (r, s) where r is in a lower part than s and add an arc from r to s if P(s|r) is nearly 1. Next, for every part, the system can order the nodes in the part arbitrarily into <$r_1, r_2, \ldots r_k$>2. For every (i, j): i<j≤k, if P ($r_j|r_i$) is nearly 1, the system can add an arc. Since the directed graph is acyclic, the system can take advantage of this fact to prune rules on the directed acyclic graph as follows:
repeat
    delete all nodes with in-degree 0 and out-degree >0
until no such node exists.

During the conjunctive rule addition phase, the system reclassifies all the instances by the current rule set in a third pass over the training set. During this process, exactly one of the following happens for any one instance: the rule set predicts the instance's label correctly, multiple rules fire and make conflicting predictions, multiple rules fire and make the same wrong prediction, or one rule fires and makes the wrong prediction. If one rule fires and makes the wrong prediction, the system ignores the error because it as an "exception case" for a high confidence unary rule and because fixing this error would require changing the label of this rule, which may regress on other cases this rule covers. If the multiple rules firing on an instance make at least one wrong prediction, the system proposes a new rule—a rule whose antecedent contains multiple features—that will resolve the conflict. The system proposes a new rule rather than creating the new rule because the system does not immediately add this new rule to the rule set. Rather, the system finishes the pass over the training set, and collects instances of all proposed rules. After the pass is over, the system derives suitable rules from the proposed rules.

During the rule proposal sub-phase, the system proposes a rule that resolves at least one wrong label prediction from multiple rules firing on an input instance. From such a rule set, the system constructs a certain subset in which all the rules (if any) that predict the correct label of the instance are removed. For example, suppose the following rules fired:
a→1
b→2
c→1
d→3
and the instance's correct label is 1. Then the created subset of these rules would be {b, d}. The proposed rule is one whose antecedent is this subset and whose consequent is the correct label for this instance. Based on the example above, the system would propose the new rule b, d→1

As the system proposes conjunctive rules while processing the data set, the system collects statistics, for various feature sets, towards their support and the distribution of their label predictions. The support of a feature set is the number of times a rule with this feature set as the antecedent is proposed. The distribution of a feature set's label predictions is captured because during this phase the system can propose (on different instances) different new rules having the same antecedent. This can happen when the labeling problem has noisy labels. The system collects the proposed rule statistics into a map whose keys are features sets, denoting antecedents. The value associated with a key is a tuple comprised of the feature set's support and the distribution over its consequent labels.

Once the pass over the training set is done, the system processes the proposed rule statistics data structure to extract good conjunctive rules to add during the new rules construction sub-phase. Let F→(s, p) denote an entry in this map, where F is a set of features, s is its support, and p is the distribution over the labels of rules proposed with F as the antecedent. For each entry in this map in order of the highest support first, the system determines whether a high precision rule can be derived from this entry by checking, if in p, there is a label whose mass is at least θ. If a high precision rule can be derived from an entry, the system adds this derived rule to the rule set.

If the system iterates over all entries in the map and creates as many rules as possible, the system may create more rules than necessary. An iterative version of this process mitigates this issue. This is:

```
unclassified_instances = instances on which conflicting rules fired
For each entry in this map in order of highest support first
    If a high-precision rule can be derived from this entry
        Add this rule.
        Delete from unclassified_instances all instances covered by this rule.
        STOP if no unclassified_instances remain.
    endif
endfor
```

The addition of conjunctive rules needs a generalization of rule set semantics of two sorts. A rule pre-fires when the input instance contains all features that are in its antecedent. If, on an input instance, the antecedent of a rule that pre-fired is a proper subset of the antecedent of another that pre-fired, then the former's pre-firing is discarded. The rules that survive the subset discarding analysis above are said to have fired, on the particular instance.

In view of the complexity of the algorithm, a number of illustrative examples may be helpful. In all of them, the confidence threshold θ is set to 0.8.

The first example is a version of the Boolean function XOR, chosen because of its simplicity and because it is one of the simplest examples needing non-linear classification. The input has two features, a and b. The label is 1 if and only if exactly one of these features appears in the input. The training set is the truth table—shown below—of this Boolean function.

| Input | Label |
|---|---|
| Neither a nor b is present | 0 |
| a is present, but b is not present | 1 |
| b is present but a is not present | 1 |
| Both a and b are present | 0 |

θ is set to 0.8. During the first pass, the system creates only one rule:
→0
This rule could alternately be
→1

The tie is broken arbitrarily in view of the symmetry in this example. The system does not create any other rule because no rule with a or b as the antecedent has a confidence of at least 80%. (a predicts 1 in one case and predicts 0 in another case, while b predicts 0 in one case and predicts 1 in another case) Since the system will not create any additional rules during the conjunctive phase either, the system would appear to be limited to 50% accuracy. The use of four features—a, b, â (not a), and ɓ (not b) instead can resolve this challenge. As before, in the first phase, the system creates only one rule:
→0
No (unary) rule with any of the four features as antecedents has a confidence level of at least 80%. In the conjunctive phase, the system creates two rules:
a, ɓ →1
â, b→1
The final rule set is:
→0
a, ɓ →1
â, b→1
This classifies the entire training set correctly.

In an example based on the Boolean AND function, the input has two features a and b. The label is 1 if and only if both features appear in the input. The training set is the truth table of this Boolean function.

| Input | Label |
|---|---|
| Neither a nor b is present | 0 |
| a is present, but b is not present | 0 |
| b is present but a is not present | 0 |
| Both a and b are present | 1 |

In the first phase, the system creates only one rule:
→0
No other unary rule has a sufficiently high confidence level. The only instance this rule classifies wrongly is when a and b are both present in the input. To correct this, during the conjunctive phase the system adds
a, b→1
The final rule set is:
→0
a, b→1
which classifies all instances in the training set correctly. Note that when any rule with a non-empty antecedent fires, the rule with the empty antecedent is over-ridden or superseded.

FIG. 1 is an operational flow diagram illustrating a high level overview of a method 100 for rule set induction. The examples of data structures which are mentioned below in reference to FIG. 1 are depicted in FIGS. 2A-B and described below in reference to FIGS. 2A-B.

A training set of multiple inputs is received, each input associated with a corresponding output label and including a corresponding set of features, block 102. The system uses the training set of inputs and labels to induce an optimized rule set that correctly predicts labels for inputs. For example and without limitation, this can include the system receiving a training set of server name inputs with corresponding value labels: a1.c.com with high value, a2.c.com with high value, b1.c.com with high value, b2.c.com with high value, d.e.com with low value, f.g.com with low value, and c.g.com with low value. The system can induce rules from such a training set, and use these induced rules to predict whether a new named server is high value or not, which is a useful prediction for intruder detection systems because intruders are more likely to seek high value targets than low value targets. A training set can be a group or collection of things that teach a particular skill or type of behavior through practice and instruction over a period of time. An input can be what is put in, taken in, or operated on by a process or system. An output label can be a classifying phrase or name applied to a person or thing, which is produced, delivered, or supplied using a computer or other device. A set of features can be a group or collection of a distinctive attributes or aspects of some things.

Having received the training set, a corresponding rule is created for each feature in the training set, each rule including a corresponding antecedent feature and a corresponding consequent label, with each rule being stored in a rule set hierarchy, block 104. The system bases the optimized rule set on these rules. By way of example and without limitation, this can include the system creating a corresponding rule for each server name's feature predicting a corresponding value: a1 predicts high value, a2 predicts high value, b1 predicts high value, b2 predicts high value, c predicts both high value and low value, d predicts low value, e predicts low value, f predicts low value, and g predicts low value. FIG. 2A depicts a rule set hierarchy 200 that stores these rules induced directly from the training set. A rule can be a principle that operates within a particular sphere of knowledge, describing or prescribing what is possible or allowable. An antecedent feature can be a distinctive attribute or aspect of some thing that logically precedes another thing. A consequent label can be a classifying phrase or name applied to a person or thing that follows as a result or an effect. A rule set hierarchy can be principles that operate within a particular sphere of knowledge arranged or classified according to relative importance or inclusiveness.

Figures 2A, 2B, 2C:
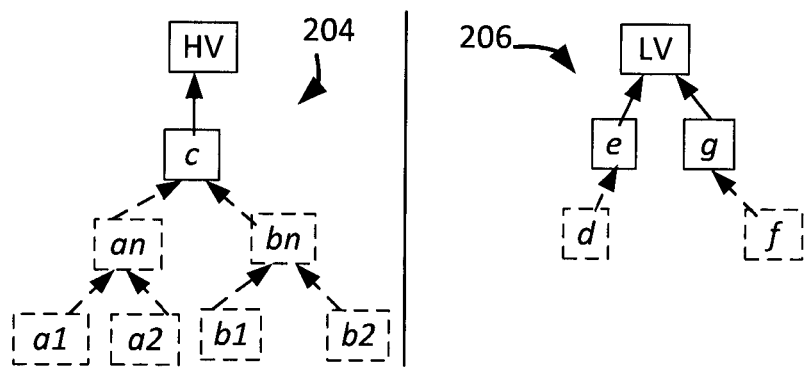
FIGS. 2A-C illustrate example data structures used for rule set induction, in an embodiment.

In some embodiments, the system extracts features and labels from the training set inputs, stores the features and the labels in the rule set hierarchy 200, stores some of these features and labels in the rule partition data structure 202 depicted in FIG. 2B, and creates rules based on the features and labels that are stored in the rule partition data structure 202. For example, the system extracts a1 and high value from one input, extracts a2 and high value from another input, stores a1, high value, a2, and high value in the rule set hierarchy 200, generalizes the features a1 and a2 as an, stores an and high value in the rule partition data structure 202, and creates the rule an predicts high value. In other embodiments, the system extracts features and labels from the training set inputs, stores the features and the labels in the rule set hierarchy 200, creates potential rules based on the features and labels stored in the rule set hierarchy 200, stores some of these features and labels in the rule partition data structure 202, and creates rules based on the features and labels that are stored in the rule partition data structure 202. For example, the system extracts a1 and high value from one input, extracts a2 and high value from another input, stores a1, high value, a2, and high value in the rule set hierarchy 200, creates the potential rule a1 predicts high value, creates the potential rule a2 predicts high value, generalizes the features a1 and a2 as an, stores an and high value in the rule partition data structure 202, and creates the rule an predicts high value.

Creating a corresponding rule for each feature in the training set may include creating a generalized feature by generalizing a feature that is associated with a number of inputs, and creating a corresponding rule for the generalized feature if the generalized feature is associated with more than the number of inputs. Generalizing the feature may include replacing any suffix numerals with corresponding suffix placeholders, and replacing any suffix placeholders with a single suffix placeholder. For example, the system generalizes the feature a1 by replacing the suffix numeral 1 with a corresponding suffix placeholder d, and replacing the suffix placeholder d with a single suffix placeholder n to create the generalized feature an. Since the feature a1 covers one input a1, and the generalized feature an covers the two inputs a1 and a2, the system creates an additional rule, an predicts high value, for the generalized feature an. In another example, the system generalizes the feature b1 by replacing the suffix numeral 1 with a corresponding suffix placeholder d, and replacing the suffix placeholder d with a single suffix placeholder n to create the generalized feature bn. Since the feature b1 covers one input b1, and the generalized feature bn covers the two inputs b1 and b2, the system creates an additional rule, bn predicts high value, for the generalized feature bn. FIG. 2A depicts a rule set hierarchy that stores these additional rules. When the system creates rules and stores the rules in such a rule set hierarchy, the system also determines and stores the support for each rule, the confidence for each rule, and whether a rule has a parent feature. For example, after the system created the additional rule for the generalized features an and bn, the system stored these generalized features as the parent features for the respective features a1, a2, b1, and b2, as depicted in FIG. 2A. Note that the children rules can only be deleted if their parent rules have sufficiently high confidence. Since the rules created for these parent features are optimized rules relative to the rules for the children features, the system can delete the rules for the now redundant children features. For example, since the single rule for the generalized feature an covers the two features a1 and a2 that are covered by two rules, the system deletes the two redundant rules that cover nothing more than the respective features a1 and a2. In another example, since the single rule for the generalized feature bn covers the two features b1 and b2 that are covered by two rules, the system deletes the two redundant rules that cover nothing more than the respective features b1 and b2.

After creating the rules, each rule is distributed into a rule partition associated with a consequent label or another rule partition associated with another consequent label, block 106. The system compares rules in each partition, rules that predict the same labels, to optimize the rule set. In embodiments, this can include the system distributing the 3 rules for the features an, bn, and c into a high value rule partition and the 4 rules for the features d, e, f and g into a low value rule partition. A rule partition can be the state of principles that operate within a particular sphere of knowledge being divided into parts.

Since the rules are now distributed to partitions, a number of inputs that include an antecedent feature of a rule in the rule partition is identified, block 108. The system identifies the support for a feature in a partition to determine if the rule for the feature can be deleted. For example and without limitation, this can include the system identifying that 2 inputs include the an feature for the rule an predicts high value in the high value rule partition. In another example, the system identifies that 2 inputs include the bn feature for the rule bn predicts high value in the high value rule partition. In an alternative example, the system identifies that 5 inputs include the c feature for the rule c predicts high value in the high value rule partition. A number can be an arithmetical value, representing a particular quantity and used in counting and making calculations.

Once the number of inputs for an antecedent feature is identified, another number of inputs that include both the antecedent feature of the rule and another antecedent feature of another rule in the rule partition is identified, block 110. The system identifies the support for a combination of features in a partition to determine if any the rules for the features can be deleted. By way of example and without limitation, this can include the system identifying that 2 inputs include both the an feature for the rule an predicts high value and the c feature for the rule c predicts high value in the high value rule partition. In another example, the system identifies that 2 inputs include both the bn feature for the rule bn predicts high value and the c feature for the rule c predicts high value in the high value rule partition. In a further example, the system identifies that 0 inputs include both the an feature for the rule an predicts high value and the bn feature for the rule bn predicts high value in the high value rule partition.

After identifying the numbers for their respective inputs, a determination is made whether a ratio of the other number of inputs to the number of inputs satisfies a threshold and an additional number of inputs that includes the other antecedent feature is at least as much as the number, block 112. In embodiments, this can include the system determining whether the 1.0 ratio of 2 an and c inputs to 2 an inputs satisfies a threshold value of 0.8 and the 5 inputs that includes the feature c is at least as much as the 2 inputs that includes the feature an. In another example, the system determines whether the 1.0 ratio of 2 bn and c inputs to 2 bn inputs satisfies a threshold value of 0.8 and the 5 inputs that includes the feature c is at least as much as the 2 inputs that includes the feature bn. In a further example, the system determines whether the 0.0 ratio of 0 an and bn inputs to 2 an inputs satisfies a threshold value of 0.8 the 2 inputs that includes the feature an is at least as much as the 2 inputs that includes the feature bn. By using a threshold value that is less than 1.0, the system initially optimizes the rule set based on rules that correctly predict labels for many but not all inputs, striking an initial balance between optimization and correct predictions. For example, an initial rule set of 10 rules that correctly predicts labels for 99% on the training set inputs may be preferable to an initial rule set of 1,000 rules that correctly predicts labels for 100% of the training set inputs. Furthermore, conjunctive rule addition may require only a few additional rules to correct for the 1% of incorrect labels for the training set inputs.

The system can distribute the features in each partition into parts, as described below in reference to FIG. 2B, which would result in eliminating the need for the system to determine any additional ratios. Even though none of the additional ratios satisfy the threshold value of 0.8, the use of parts in the partitions may enable the system to be more efficient by eliminating the need to compute and compare these additional ratios. The system can test for arc creation from node u to node v when node u is in a lower part of a partition than node v's part. Then the system executes the pruning algorithm. Only if some parts contained multiple nodes would the system then test, for pairs of nodes in the same part (for each such part), which arcs to add. For example, the partition for the high value label includes the nodes an, bn, and c, with nodes an and bn in part 1 and node c in part 2. First, the system only considers adding arcs from nodes in part 1 to nodes in part 2, creates one arc from node an to node c, and creates another arc from node bn to node c. Now using the graph algorithm, which deletes nodes with out-degrees that are greater than zero, the system deletes the nodes an and bn, leaving only node c, thereby avoiding having to test whether there should be an arc between node an and node bn (from one to the other) or not. A ratio can be the quantitative relation between two amounts showing the number of times one value contains or is contained within the other. A threshold can be the magnitude that must be exceeded or met for a certain reaction, phenomenon, result, or condition to occur or be manifested. If the ratio of the other number of inputs to the number of inputs satisfies the threshold and the additional number of inputs that includes the other antecedent feature is at least as much as the number, the method 100 continues to block 114 to delete a redundant rule. If the ratio of the other number of inputs to the number of inputs does not satisfy the threshold or the additional number of inputs that includes the other antecedent feature is not at least as much as the number, the method 100 may proceed to optional block 116 or to block 120.

If the ratio of the other number of inputs to the number of inputs satisfies the threshold and the additional number of inputs that includes the other antecedent feature is at least as much as the number, the rule is deleted from the rule set hierarchy, block 114. The system optimizes the rule set by deleting redundant rules. For example and without limitation, this can include the system deleting the redundant rule a1 predicts high value from the rule set hierarchy because the 1.0 ratio of 2 an and c inputs to 2 an inputs satisfies the threshold value of 0.8 and the 5 inputs that includes the feature c is at least as much as the 2 inputs that includes the feature an. In another example, the system deletes the redundant rule b1 predicts high value from the rule set hierarchy because the 1.0 ratio of 2 bn and c inputs to 2 an inputs satisfies the threshold value of 0.8 and the 5 inputs that includes the feature c is at least as much as the 2 inputs that includes the feature bn. In these two preceding examples, the rules for the features an and bn are redundant because the input ratios indicate that every input which includes the feature a1, a2, b1, or b2 also includes the feature c and the additional number of inputs that includes the other antecedent feature is at least as much as the number. Therefore, the system retains only a single rule for the feature c instead of retaining multiple rules for the features an and bn, thereby resulting in optimizing the induced rule set. Satisfying a threshold can be exceeding or meeting the magnitude for a certain reaction, phenomenon, result, or condition to occur or be manifested. Deleting a rule from a rule set hierarchy can be removing a principle that operates within a particular sphere of knowledge from an arrangement or classification according to relative importance or inclusiveness.

Having deleted any redundant rules from the rule set hierarchy, an output label is optionally predicted for an input in the training set by applying each remaining rule in the rule set hierarchy to the training set, block 116. The system applies the remaining rules to training set inputs to identify any incorrect output labels, which enables the correction of corresponding rules. By way of example and without limitation, this can include the system predicting both high value and low value for the training set input c.g.com because the remaining rules include the conflicting rules c predicts high value and g predicts low value. An incorrect output label can be a classifying phrase or name applied to a person or thing that is not in accordance with facts, such as when the label predicted for a training set input does not match the corresponding label in the training set. Predicting an output label can be estimating that a classifying phrase is applied to a thing that is produced, as a consequence of something. A remaining rule in a rule set hierarchy can be a principle that operates within a particular sphere of knowledge and continues to exist after other similar or related principles have ceased to exist. Applying each remaining rule can be putting a principle that continues to exist into operation within a particular sphere of knowledge.

If an output label predicted for an input is incorrect, an additional rule is optionally created to predict a correct output label for the input in the training set, the additional rule superseding other rules in the rule set hierarchy that apply to the input in the training set, block 118. The system can create new rules to correct for any incorrect predictions made by the optimized training set. In embodiments, this can include the system creating a new rule, c and g predicts low value, based on the antecedent features c and g from the conflicting rules and the consequent output label low value from the training set, which pairs c.g.com with low value. When multiple rules apply to the same input, the system compares the antecedent features of the rules, and bases the prediction on the rule whose antecedent features are a proper superset of the other rules' antecedent features. For example, since the rules c and g predicts low value, g predicts low value, and c predicts high value all apply to the input c.g.com, the system predicts low value for this input based on the rule c and g predicts low value because the antecedent features c and g is a superset of the antecedent feature c and the antecedent feature g. A correct output label can be a classifying phrase or name applied to a person or thing that is in accordance with facts, such as when the label predicted for a training set input matches the corresponding label in the training set. A rule superseding other rules that apply to the same input can be a principle that operates within a particular sphere of knowledge to take the place of or supplant other principles that operate within the particular sphere of knowledge with respect to the same input.

Creating an additional rule to predict the correct output label for the input in the training set may include creating an additional rule to predict the correct output label for a first number of inputs in the training set that include the input in the training set, creating another additional rule to predict the correct output label for a second number of inputs in the training set that include the input in the training set, and removing the other additional rule from the rule set hierarchy if the first number of inputs in the training set is at least as many as the second number of inputs in the training set. For example, the system predicts an incorrect label for an input in the training set by applying the remaining rules to the input, proposes a new rule that applies to 4 inputs that include the input, and proposes another new rule that applies to 2 inputs that include the input. Based on this example, the system creates the proposed new rule instead of creating the proposed other new rule because the proposed new rule has more support than the proposed other new rule.

Following the optimization of the rule set, a corresponding output label is predicted for an input including a corresponding set of features by applying each remaining rule in the rule set hierarchy to the input, block 120. The system uses the optimized rule set to efficiently predict labels for subsequent inputs. For example and without limitation, this can include the system efficiently predicting high value for an input that includes the features a1 and c by applying each remaining rule in the rule set hierarchy to the input, without applying either the deleted redundant rule an predicts high value or the deleted redundant rule a1 predicts high value. In this example, the system began with five induced rules that predict high value, based on the input features a1, a2, b1, b2, and c, and optimized the rule set by deleting four of these rules to result in an optimized rule set that includes only one rule that predicts high value, the rule c predicts high value.

The method 100 may be repeated as desired. Although this disclosure describes the blocks 102-120 executing in a particular order, the blocks 102-120 may be executed in a different order. In other implementations, each of the blocks 102-120 may also be executed in combination with other blocks and/or some blocks may be divided into a different set of blocks.

FIGS. 2 A-C illustrate simplified example data structures for rule set induction, under an embodiment. FIG. 2 A depicts a rule set hierarchy 200 for the example rules discussed above in reference to block 104. The rule set hierarchy 200 includes the rules with the generalized antecedent features an and bn that are generalized from the features a1, a2, b1, and b2, respectively. The rule set hierarchy 200 also includes the support for each rule, the confidence for each rule, and whether a rule has a parent feature. For example, the feature c has the support of 5 because the feature c is in 5 training set inputs, and the high confidence label is high value with a confidence of 0.8 because 4 of the 5 inputs that include the feature c are paired with the label high value.

FIG. 2 B depicts a rule partition data structure 202 for the example rules discussed above in reference to blocks 104-112. Rather than compare the ratio of the number of co-occurrences of features in inputs to the number of component features in inputs for every possible combination of features, the system can allocate the features in a partition to parts that correspond to the feature's level of support. For example, since the features an and bn both have the support of 2 and the feature c has the support of 5, the system allocates the features an and bn to the part r of the high value partition P1 and allocates the feature c to the part s of the high value partition P1. For every pair of rules (r, s), the system can calculate $n_{rs}$, the number of inputs in the training set which include both r and s. Then the system can calculate the conditional probability $P(s|r)=n_{rs}/n_r$ for every pair (r, s) to determine which rules are covered by other rules.

In addition to the system making these calculations based on features assigned to different parts, the system can also order the features in the same part, and then make the same calculations as if an ordered feature is in the part r and a subsequent ordered feature is in the part s. For example, feature d and feature e are both initially in the part r of the low value partition P2 since these features both have the support of 1, and the system makes no initial calculations because all features in the low value partition P2 are allocated to the same part r. Then the system orders the features in the low value partition P2 as (d, e, f g), and makes the calculations based the feature d being in the r part and the feature e as if the feature e was in the s part, because the feature e is subsequent to the feature d in the order (d, e, f g). Since the conditional probability of 1.0 for the feature e given the feature d satisfies the threshold 0.8, the system deletes the rule d predicts low value because every training set input covered by this rule is also covered by the rule e predicts low value. Similarly, since the conditional probability of 1.0 for the feature g given the feature f satisfies the threshold 0.8, the system deletes the rule f predicts low value because every training set input covered by this rule is also covered by the rule g predicts low value. When the system is finished deleting redundant rules, the system has pruned the initial rule set of eight induced rules to create an optimized rule set that includes only three rules: c predicts high value, e predicts low value, and g predicts low value. As describe above in reference to block 118, the system also adds the rule c and g predicts high value to address conflicting predictions that occurred when the optimized rule set was initially applied to the training set.

FIG. 2 C depicts directed graphs 204 and 206 for the example rules discussed above in reference to blocks 104-112 and FIG. 2 B. The directed graph 204 is for the rules that predict high value, and the directed graph 206 is for the rules that predict low value. The directed graph 204 initially had five nodes, for the five features a1, a2, b1, b2, and c, which predicted high value. When the system generalized the features a1 and a2 as the generalized feature an, the system deleted the nodes for a1 and a2 because the rule for an predicts high value more efficiently. Similarly, when the system generalized the features b1 and b2 as the generalized feature bn, the system deleted the nodes for b1 and b2 because the rule for bn predicts high value more efficiently. After the system calculated the conditional probabilities for the features an, bn, and c, the system created a directed arc from an to c, created a directed arc from bn to c, and deleted the nodes for an and bn because the directed arcs indicate that the rule for c predicts high value more efficiently.

The directed graph 206 initially had four nodes, for the four features d, e, f, and g, which predicted low value. After the system calculated the conditional probabilities for the features d, e, f and g, the system created a directed arc from d to e, created a directed arc from f to g, and deleted the nodes for d and f because the directed arcs indicate that the rule for e and the rule for g predict low value more efficiently.

System Overview

Figure 3:
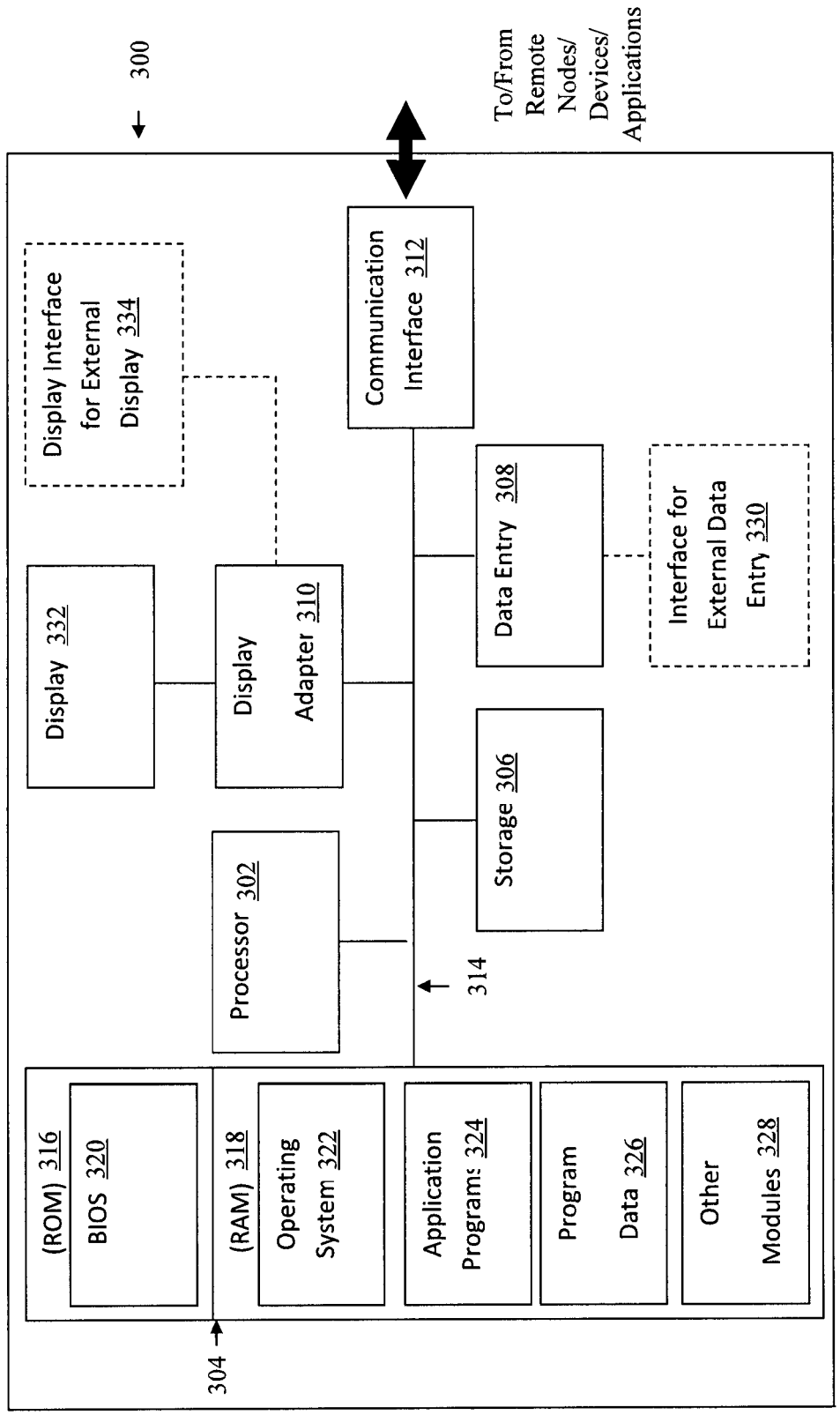
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for rule set induction, the system comprising:
one or more processors; and
a non-transitory computer readable medium storing a plurality of instructions, which when executed, cause the one or more processors to:
  receive a training set comprising inputs having features associated with output labels:
  create, by a machine-learning system, rules corresponding to the features in the training set;
  store the rules in a rule set hierarchy, the rules comprising antecedent features and consequent labels corresponding to the training set features;
  copy each of the rules comprising a first consequent label into a first partition of rules and each of the rules comprising a second consequent label into a second partition of rules;
  identify a first antecedent feature that is in a first rule in the first partition of rules;
  identify a first number of the inputs that comprises the first antecedent feature;
  identify a second antecedent feature that is in a second rule in the first partition of rules;
  identify a second number of the inputs that comprises the second antecedent feature and a third number of the inputs that comprises the first antecedent feature and the second antecedent feature;
  identify a ratio of a count of the third number of the inputs to a count of the first number of the inputs;

determine whether the ratio satisfies a threshold and whether a count of the second number of the inputs is at least as much as the count of the first number of the inputs;

delete the first rule from the rule set hierarchy in response to a determination that the ratio satisfies the threshold and the count of the second number of the inputs is at least as much as the count of the first number of the inputs;

predict, by the machine-learning system, an output label for a training input in the training set by applying each remaining rule in the rule set hierarchy to the training input;

determine whether the output label is correct for the training input;

train the machine-learning system to create a corrective rule that predicts a correct output label for the training input, in response to a determination that the output label is incorrect for the training input, the corrective rule superseding other rules in the rule set hierarchy that apply to the training input; and predict, by the trained machine-learning system, an output label for an input comprising a set of features by applying each remaining rule in the rule set hierarchy to the input comprising the set of features.

2. The system of claim 1, wherein the output labels comprise categorical values.

3. The system of claim 1, wherein the consequent labels are associated with a specific output label of the output labels for a percentage of the features in the training set, the percentage of the features associated with satisfying a confidence level for the specific output label.

4. The system of claim 1, wherein the plurality of instructions to create rules corresponding to the features in the training set further comprises instructions, which when executed, cause the one or more processors to:

create a generalized feature by generalizing a feature that is associated with a fourth number of inputs;

determine whether the generalized feature is associated with more than a count of the fourth number of the inputs; and create a third rule for the generalized feature in response to a determination that the generalized feature is associated with more than the count of the fourth number of the inputs.

5. The system of claim 4, wherein generalizing the feature that is associated with the fourth number of inputs comprises replacing any suffix numerals with corresponding suffix placeholders, and replacing any suffix placeholders with a single suffix placeholder.

6. The system of claim 1, wherein the plurality of instructions to create the corrective rule to predict the correct output label for the training input in the training set further comprises instructions, which when executed, cause the one or more processors to:

create-the corrective rule to predict the correct output label for a fifth number of training inputs in the training set that comprise the training input in the training set;

create-a second corrective rule to predict the correct output label for a sixth number of training inputs in the training set that comprise the training input in the training set;

determine whether a count of the fifth number of training inputs in the training set is at least as many as a count of the sixth number of training inputs in the training set, and remove the second corrective rule from the rule set hierarchy in response to a determination that the count of the fifth number of training inputs in the training set is at least as many as the count of the sixth number of training inputs in the training set.

7. A computer program product comprising computer-readable program code to be executed by one or more processors when retrieved from a non-transitory computer-readable medium, the program code including instructions to:

receive a training set comprising inputs having features associated with output labels;

create, by a machine-learning system, rules corresponding to the features in the training set;

store the rules in a rule set hierarchy, the rules comprising antecedent features and consequent labels corresponding to the training set features;

copy each of the rules comprising a first consequent label into a first partition of rules and each of the rules comprising a second consequent label into a second partition of rules;

identify first antecedent feature that is in a first rule in the first partition of rules;

identify a first number of the inputs that comprises the first antecedent feature;

identify a second antecedent feature that is in a second rule in the first partition of rules;

identify a second number of the inputs that comprises the second antecedent feature and a third number of the inputs that comprises the first antecedent feature and the second antecedent feature;

identify a ratio of a count of the third number of the inputs to a count of the first number of the inputs;

determine whether the ratio satisfies a threshold and whether a count of the second number of the inputs is at least as much as the count of the first number of the inputs;

delete the first rule from the rule set hierarchy in response to a determination that the ratio satisfies the threshold and the count of the second number of the inputs is at least as much as the count of the first number of the inputs;

predict, by the machine-learning system, an output label for a training input in the training set by applying each remaining rule in the rule set hierarchy to the training input;

determine whether the output label is correct for the training input;

train the machine-learning system to create a corrective rule that predicts a correct output label for the training input, in response to a determination that the output label is incorrect for the training input, the corrective rule superseding other rules in the rule set hierarchy that apply to the training input; and predict, by the trained machine-learning system, an output label for an input comprising a set of features by applying each remaining rule in the rule set hierarchy to the input comprising the set of features.

8. The computer program product of claim 7, wherein the output labels comprise categorical values.

9. The computer program product of claim 7, wherein the consequent labels are associated with a specific output label of the output labels for a percentage of the features in the training set, the percentage of the features associated with satisfying a confidence level for the specific output label.

10. The computer program product of claim 7, wherein the program code instructions to create rules corresponding to the features in the training set further comprise instructions, which when executed, cause the one or more processors to:

create a generalized feature by generalizing a feature that is associated with a fourth number of inputs;

determine whether the generalized feature is associated with more than a count of the fourth number of the inputs; and create a third rule for the generalized feature in response to a determination that the generalized feature is associated with more than the count of the fourth number of the inputs.

11. The computer program product of claim 10, wherein generalizing the feature that is associated with the fourth number of inputs comprises replacing any suffix numerals with corresponding suffix placeholders, and replacing any suffix placeholders with a single suffix placeholder.

12. The computer program product of claim 7, wherein the program code instructions to create the corrective rule to predict the correct output label for the training input in the training set further comprise instructions, which when executed, cause the one or more processors to:

create the corrective rule to predict the correct output label for a fifth number of training inputs in the training set that comprise the training input in the training set;

create a second corrective rule to predict the correct output label for a sixth number of training inputs in the training set that comprise the training input in the training set;

determine whether a count of the fifth number of training inputs in the training set is at least as many as a count of the sixth number of training inputs in the training set, and remove the second corrective rule from the rule set hierarchy in response to a determination that the count of the fifth number of training inputs in the training set is at least as many as the count of the sixth number of training inputs in the training set.

13. A method comprising:

receiving a training set comprising inputs having features associated with output labels;

creating, by a machine-learning system, rules corresponding to the features in the training set;

storing the rules in a rule set hierarchy, the rules comprising antecedent features and consequent labels corresponding to the training set features;

copying each of the rules comprising a first consequent label into a first partition of rules and each of the rules comprising a second consequent label into a second partition of rules;

identifying a first antecedent feature that is in a first rule in the first partition of rules;

identifying a first number of the inputs that comprises the first antecedent feature;

identifying a second antecedent feature that is in a second rule in the first partition of rules;

identifying a second number of the inputs that comprises the second antecedent feature and a third number of the inputs that comprises the first antecedent feature and the second antecedent feature;

identifying a ratio of a count of the third number of the inputs to a count of the first number of the inputs;

determining whether the ratio satisfies a threshold and whether a count of the second number of the inputs is at least as much as the count of the first number of the inputs;

deleting the first rule from the rule set hierarchy, in response to a determination that the ratio satisfies the threshold and the count of the second number of the inputs is at least as much as the count of the first number of the inputs;

predicting, by the machine-learning system, an output label for a training input in the training set by applying each remaining rule in the rule set hierarchy to the training input;

determining whether the output label is correct for the training input;

training the machine-learning system to create a corrective rule that predicts a correct output label for the training input, in response to a determination that the output label is incorrect for the training input, the corrective rule superseding other rules in the rule set hierarchy that apply to the training input; and predicting, by the trained machine-learning system, an output label for an input comprising a set of features by applying each remaining rule in the rule set hierarchy to the input comprising the set of features.

14. The method of claim 13, wherein the output labels comprise categorical values, the consequent labels are associated with a specific output label of the output labels for a percentage of the features in the training set, and the percentage of the features associated with satisfying a confidence level for the specific output label.

15. The method of claim 13, wherein creating rules corresponding to the features in the training set comprises:

creating a generalized feature by generalizing a feature that is associated with a fourth number of inputs;

determining whether the generalized feature is associated with more than a count of the fourth number of the inputs; and creating a third rule for the generalized feature in response to a determination that the generalized feature is associated with more than the count of the fourth number of the inputs.

16. The method of claim 15, wherein generalizing the feature that is associated with the fourth number of inputs comprises replacing any suffix numerals with corresponding suffix placeholders, and replacing any suffix placeholders with a single suffix placeholder.

17. The method of claim 13, wherein creating the corrective rule to predict the correct output label for the input in the training set comprises:

creating the corrective rule to predict the correct output label for a fifth number of training inputs in the training set that comprise the training input in the training set;

creating a second corrective rule to predict the correct output label for a sixth number of training inputs in the training set that comprise the training input in the training set;

determining whether a count of the fifth number of training inputs in the training set is at least as many as a count of the sixth number of training inputs in the training set, and removing the second corrective rule from the rule set hierarchy in response to a determination that the count of the fifth number of training inputs in the training set is at least as many as the count of the sixth number of training inputs in the training set.

\* \* \* \* \*